(12) United States Patent
Hubert et al.

(10) Patent No.: US 7,590,934 B2
(45) Date of Patent: Sep. 15, 2009

(54) META-DOCUMENT AND METHOD OF MANAGING

(75) Inventors: Laurence Hubert, Saint Bernard du Touvet (FR); Michel Gastaldo, Montbonnot (FR)

(73) Assignee: Xerox Corporation, Norwalk, CT (US)

( * ) Notice: Subject to any disclaimer, the term of this patent is extended or adjusted under 35 U.S.C. 154(b) by 600 days.

(21) Appl. No.: 10/766,675

(22) Filed: Jan. 27, 2004

(65) Prior Publication Data

US 2004/0194025 A1 Sep. 30, 2004

Related U.S. Application Data

(63) Continuation of application No. 09/404,174, filed on Sep. 24, 1999, now abandoned.

(51) Int. Cl.
*G06F 17/00* (2006.01)
*G06F 17/30* (2006.01)
*G06F 15/177* (2006.01)

(52) U.S. Cl. .......... 715/234; 715/205; 715/255; 715/751; 707/10; 707/E17.008

(58) Field of Classification Search .......... 715/500, 715/501.1, 511, 526, 200, 205, 209, 210, 715/234, 255, 256, 273, 733, 737, 750, 751, 715/201, 202, 226, 229, 231, 246, 254, 700, 715/760; 707/10, 102, 203, 204, 3, 200, 707/1, 100, 101, 104.1, 4, 5, 6, 8, E17.001, 707/E17.002, E17.008, E17.009, E17.013, 707/E14.014, E17.015
See application file for complete search history.

(56) References Cited

U.S. PATENT DOCUMENTS 4,503,499 A 3/1985 Mason et al. ............ 364/200

(Continued)

FOREIGN PATENT DOCUMENTS

CA 2192237 5/1997

(Continued)

OTHER PUBLICATIONS

N. Glance et al., "Knowledge Pump: Supporting the Flow and Use of Knowledge," Information Technology for Knowledge Management, 1998, pp. 1-22.*

(Continued)

*Primary Examiner*—Laurie Ries
*Assistant Examiner*—MaiKhanh Nguyen
(74) *Attorney, Agent, or Firm*—Fay Sharpe LLP

(57) ABSTRACT

A meta-document includes an object conveying document information, processing information pertaining to processing of the meta-document and metadata for indexing and retrieving the processing information. The processing information is recorded on the meta-document each time the meta-document is processed in some manner. Each time processing information is recorded on the document, appropriate metadata for indexing and retrieving the processing information is also stored on the meta-document. Creation and recording of the processing information and associated metadata on the meta-document may be accomplished externally by the particular source or environment to which the meta-document may be residing. Alternatively, each meta-document may include a tool (e.g., a software program or macro) embedded on the object. Whenever the meta-document is accessed or processed, the embedded tool creates the appropriate processing information and associated metadata.

13 Claims, 2 Drawing Sheets

U.S. PATENT DOCUMENTS

| | | | | |
|---|---|---|---|---|
| 5,008,853 | A | * | 4/1991 | Bly et al. ............... 715/751 |
| 5,132,900 | A | | 7/1992 | Gilchrist et al. ............ 364/419 |
| 5,142,663 | A | * | 8/1992 | Janis et al. ............... 707/205 |
| 5,301,320 | A | * | 4/1994 | McAtee et al. ............... 705/9 |
| 5,379,423 | A | | 1/1995 | Mutoh et al. ............... 395/600 |
| 5,581,691 | A | * | 12/1996 | Hsu et al. ............... 714/15 |
| 5,857,197 | A | | 1/1999 | Mullins ............... 707/103 |
| 5,960,422 | A | | 9/1999 | Prasad ............... 707/2 |
| 5,966,707 | A | | 10/1999 | Van Huben et al. ............ 707/10 |
| 5,983,267 | A | * | 11/1999 | Shklar et al. ............... 709/217 |
| 5,999,911 | A | * | 12/1999 | Berg et al. ............... 705/9 |
| 6,044,375 | A | | 3/2000 | Shmueli et al. ............... 707/101 |
| 6,092,048 | A | * | 7/2000 | Nakaoka ............... 705/9 |
| 6,138,104 | A | * | 10/2000 | Marchak et al. ............... 705/9 |
| 6,249,795 | B1 | * | 6/2001 | Douglis ............... 715/511 |
| 6,349,238 | B1 | * | 2/2002 | Gabbita et al. ............... 700/101 |
| 6,385,604 | B1 | | 5/2002 | Bakalash et al. ............... 707/3 |
| 6,421,700 | B1 | * | 7/2002 | Holmes et al. ............... 718/100 |
| 6,466,940 | B1 | | 10/2002 | Mills ............... 707/102 |
| 6,470,333 | B1 | | 10/2002 | Baclawski ............... 707/3 |
| 6,493,731 | B1 | | 12/2002 | Jones et al. ............... 707/501.1 |
| 6,505,219 | B1 | | 1/2003 | MacLean et al. ............ 707/530 |
| 6,507,845 | B1 | * | 1/2003 | Cohen et al. ............... 707/100 |
| 6,562,076 | B2 | * | 5/2003 | Edwards et al. ............ 715/515 |
| 6,578,006 | B1 | * | 6/2003 | Saito et al. ............... 705/9 |
| 2003/0167443 | A1 | * | 9/2003 | Meunier et al. ............ 715/511 |

FOREIGN PATENT DOCUMENTS

| | | |
|---|---|---|
| EP | 0 986 009 A2 | 3/2000 |
| EP | 0 986 010 A2 | 3/2000 |
| EP | 1 003 110 A2 | 5/2000 |
| WO | WO 91/14222 | 9/1991 |

OTHER PUBLICATIONS

K. Gary et al., "Automated Process Support for Organizational and Personal Processes," ACM, Nov. 1997, pp. 221-230.*

A. Grasso et al., "Augmenting Recommender Systems by Embeding Interfaces into Practices," ACM, 1999, pp. 267-275.*

P. Koksal et al., "Workflow History Management," ACM, Mar. 1998, pp. 1-9.*

P. Dourish et al., "Freeflow: Mediating Between Representation and Action in Workflow Systems," ACM, Nov. 1996, pp. 190-198.*

Richard Bentley and Paul Dourish, "Medium versus Mechanism: Supporting collaboration through customization", Proceedings of the European Conference on Computer-Supported Cooperative Works, XX, XX, Sep. 10, 1995, pp. 1-9.

Martin Fredriksson and Mikael Svahnberg, "Fargo Technical Description", Fargo Technical Description, 1997, pp. 11.

Nigel Hinds and Chinya V. Ravishankar "Managing Metadata for Distributed Information Servers," Department of Electrical Engineering and Computer Science, IEEE, 1998, pp. 1-10.

U.S. Appl. No. 09/404,174, filed Sep. 24, 1999, Laurence Hubert, et al.

* cited by examiner

META-DOCUMENT AND METHOD OF MANAGING

CROSS-REFERENCE TO RELATED APPLICATIONS

This application is a continuation of U.S. application Ser. No. 09/404,174 filed Sep. 24, 1999, now abandoned, the contents of which are incorporated herein by reference in their entirety.

FIELD OF THE INVENTION

This invention relates generally to the management and use of documents, and in particular, to the management and use of information pertaining to the various manipulations that may be performed on documents.

BACKGROUND OF THE INVENTION

The management and use of documents has changed drastically with the evolution of electronic communications, and in particular, with the Internet and intranets. In the past, a document was simply a tangible media, such as a piece of paper, conveying information or data. Today, a document is an object conveying information that is created at a given time; it may be manipulated by various people and tools; it may be duplicated and transported from place to place; and finally it may be deleted or simply forgotten on a storage media at some location.

Only a few of all the manipulations that may be performed on a document are traceable. If a document is created by a word processing program, for example, the program may track certain types of manipulations about the document, such as editing, printing and accessing and this information may be stored with the document. However, if the document is copied, a record of the copying is usually not stored on the original document or the copy or elsewhere. If the document is translated, say from English to French via an automatic translator, the fact of the translation (even given the low quality of the translation) is not recorded on the original document. Nor is the translation itself recorded or accessible with the original document should someone desire the translation at a later date.

In addition to the information pertaining to word processing-type document manipulations, many documents are moved from site to site or from user to user. The path of distribution and the fact that a document undergoes changes through its travels add to the knowledge or information about the document. This kind of knowledge is generally not available to users, particularly users in an organization or users on an intranet or the Internet. In fact, most of the information about what happened to the document during its whole life (e.g., who read it, reviewed it, where it was sent as an email attachment, who liked it, etc.) is lost.

Generally when a document is considered important, it is simply duplicated in a large number of copies that are widely distributed. Users in an organization tend to share the feeling that the more copies are made, the more confident they are that the important knowledge contained in the document will be spread throughout the organization. In some organizations the document will be indexed and described in terms of important keywords and stored in a document management repository, where it may be accessed via an intranet or over the Internet. Then its URL will be forwarded to a certain number of users with a note to read the important information or knowledge contained in the document.

In order to store documents in a document management repository, certain additional data called metadata is stored with the document. Metadata is simply data about data. However, increasingly, the term has come to refer to data used to aid the identification, description and location of networked electronic resources, including documents. A variety of metadata formats currently exist from the basic proprietary records used in global Internet search services through a continuum encompassing simple attribute/value records.

Metadata has been used to encode information about a document, such as historical data and activity-centered information. The use of metadata has also been recognized as having a role in the ongoing management and preservation of digital resources. For example, it has been suggested that metadata could be used for recording the technological context of a resource's origins, for managing and recording rights management information, for preserving the authenticity and reliability of resources as well as for resource discovery. Preservation metadata could be used for checking the integrity of document files.

Even if important documents are placed on a document management repository and broadcast messages are sent to interested parties, current document properties and repository management features do not ensure that the right knowledge or information will be made available to the right people exactly when they need it. The importance of information/knowledge to users is not the same for all users and it depends heavily on the context. The importance of information also evolves over time; a piece of knowledge that was of not much interest to a user and deleted two months ago may suddenly become key to the user or to other users in the organization.

There is a need for a system and method of managing documents containing metadata which extracts as much metadata and information as possible from the documents. There is also a need for a system and method of managing documents which tracks all of the information about what happened to a document during its whole life (e.g., who read it, reviewed it, where it was sent as a email attachment, who liked it, etc.). There is also a need for a system and method of managing documents which stores as additional information the result of what happened to the document (for example, the comment associated with a review, the translation obtained from an automatic translator, the definitions of the terms recognized by a terminology checker tool etc.). There is also a need for a system and method of managing documents that can track document distribution data. There is a further need for a system and method of managing documents that can track a document's path of distribution and a document's changes. There is also a need for a method and a system of managing documents that can transfer information about or contained in the document to other sources and environments.

SUMMARY OF THE INVENTION

In accordance with the system of the invention, documents when processed, for example, when they are transformed from one format into another, or copied, or distributed or commented upon, do not lose any of the information they had in their previous form. Each step in the document cycle process, i.e., during the entire life-time of the document (including reading and usage), going from authoring to modification to publishing and printing to reading and using, is considered a different view of the same data or modifies a different aspect of the document. Information pertaining to each processing step is stored with the document along with metadata for indexing and retrieving the processing information. By storing a record of all the various processing and the results of the processing performed on a particular document, and making that information retrievable, users in an organization have the opportunity to come back to some piece of information about a document that later turned out to be of great importance.

The system according to the invention employs a new form of document called a meta-document. A meta-document, according to the invention, includes an object conveying document information, processing information pertaining to processing of the meta-document and metadata for indexing and retrieving the processing information. Processing information includes information pertaining to the fact that the meta-document (or the document information) was processed, by whom, any relevant tool used and the result of the processing. The processing information is recorded on the meta-document each time the meta-document is processed in some manner. Each time processing information is recorded on the document, appropriate metadata for indexing and retrieving the processing information is also stored on the meta-document.

Processing may include transformation of the document information or the meta-document itself, evaluation or analysis of the document information using a linguistic tool or a knowledge management tool, adding a user comment (such as for later transmittal to a relevance system), or distribution of the meta-document. Metadata is provided to index and retrieve each type of processing information. In this way, the processing information may be accessed by other environments, such as when the meta-document is emailed across an intranet to a relevance database. A tool at the relevance database may copy the user comment (or other processing information) stored on the meta-document.

Creation and recording of the processing information and associated metadata on the meta-document may be accomplished externally by the particular source or environment to which the meta-document may be residing. Alternatively, each meta-document may include a tool (e.g., a software program or macro) embedded on the object. Whenever the meta-document is accessed or processed, the embedded tool creates the appropriate processing information and associated metadata.

The meta-document can be thought of as an "absorber" of the processing information which was generated by manipulations or references (e.g., recommendations) made to it, including, in particular, the fact that these actions occurred. All of the processing information in the meta-document is explicit, accessible and reusable so that other tools or other people in different contexts can benefit from it. The meta-document can also be thought of as a "distributor" of processing information stored on it. Each time a meta-document is accessed by a new source or environment, the meta-document can download or leave some or all of its stored processing information.

The invention changes the current vision of the management and use of documents. Instead of managing knowledge or information extracted or created from documents outside of the documents themselves, such information can be managed with the document itself. Meta-documents (for example, encoded in XML) when processed by tools, such as knowledge management tools, are enriched by the processing information or pollen. The metadata stored in the meta-document enables similar or compatible tools to understand, find and extract the processing information.

Many documents are moved from site to site, from user to user. The path of distribution and the fact that a document undergoes changes through its travels as noted above add to the knowledge or information about the document. This processing information may also be thought of as "pollen" since it is knowledge that sticks to the document's trajectory.

The meta-document may also be used as a vehicle for spreading or distributing the knowledge or information contained within it around, even outside the originating organization. When the meta-document travels from source to source or environment, it can be considered as "pollenizing" the source. For example, when the meta-document is mailed (transmitted) to people or moved to repositories, it may be used to selectively pollenize the appropriate local knowledge tools or databases with the processing information or pollen added along the series of processing steps it went through since its creation. The meta-document or the "pollenizing document" may be used as a vector of propagation of knowledge to other knowledge management tools in different knowledge spaces.

The results of the processing of a document by any tool may be used to enrich the document with more and more knowledge. Each tool manipulating a document at any stage of its existence, in any circumstance adds to the document a piece of knowledge (pollen) about this document. The meta-document enhanced by such pollen should be able in turn to feed local tools and environments with the knowledge it has gathered along its whole chain of processing within or outside the organization.

DETAILED DESCRIPTION OF THE PREFERRED EMBODIMENTS

Figure 1:
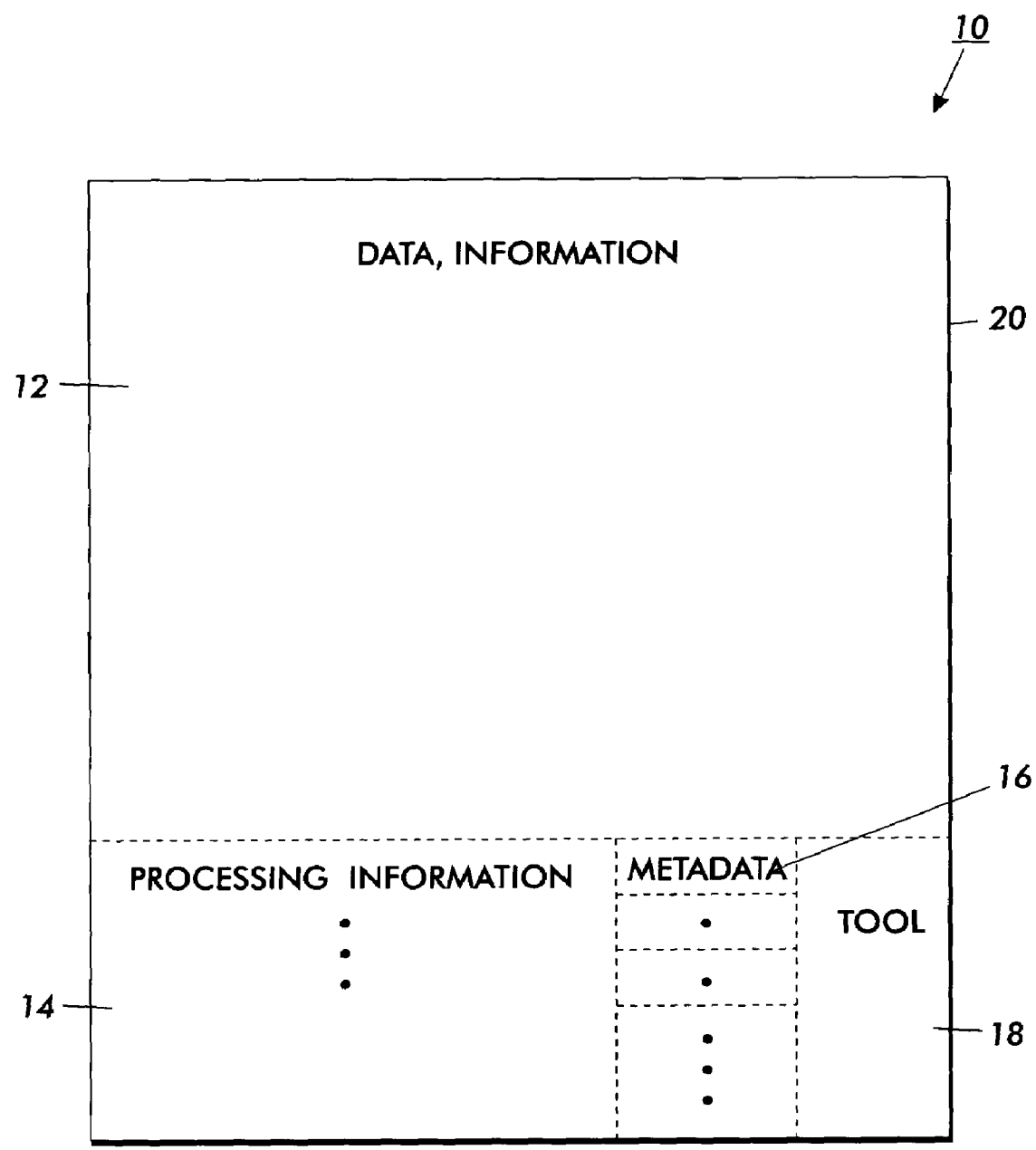
FIG. 1 is a schematic of a meta-document according to the invention.

Referring to the drawings, and now in particular with reference to FIG. 1, a meta-document according to the invention is shown therein and referred to by reference numeral 10. Meta-document 10 includes an object 20, which may be a file structure if the meta-document is stored electronically, or a type of media, such as a floppy disk, piece of paper, magnetic tape, etc. Meta-document 10 also includes document information or data 12. Information or data 12 may be the substance of a letter or a spreadsheet of user input information or any other typical data or information that a user might want to record. Processing information 14 is stored for each processing of the information 12 or meta-document 10. Metadata 16 is used to index and retrieve its associated processing information.

Optional tool 18 is shown in meta-document 10. In this embodiment, tool 18 is an embedded software program, interface or macro which generates and stores processing information 14 and associated metadata 16 for indexing and retrieving the processing information 14. Whenever the meta-document 10 is accessed or processed, tool 18 generates a piece of processing information 14 and metadata 16 to record that fact. Alternatively, meta-document 10 may include no tool 18. In that embodiment, the tool for generating and storing processing information and metadata will be located at each source or environment that interacts with meta-document 10.

Figure 2:
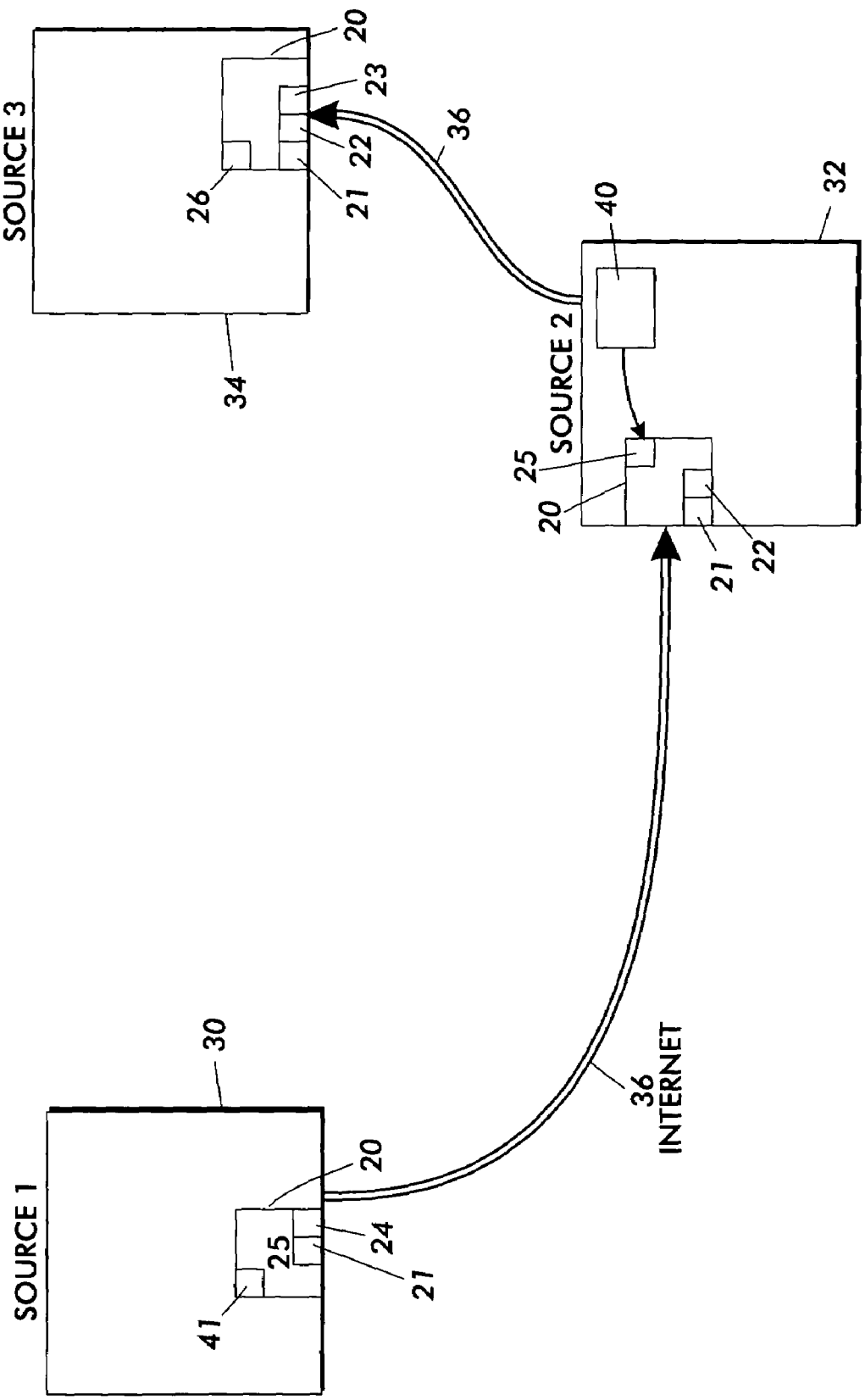
FIG. 2 is a schematic showing movement and processing of a meta-document from source to source.

A schematic representation of how a meta-document is transformed during part of its life and is used to pollenize an environment is shown in FIG. 2. Meta-document 20, which includes document information 25, is created or presently associated with source or environment 30. Processing information 21 is created (in this embodiment by source 30) and stored on meta-document 20. Metadata 24 is also created and is used to index and retrieve the stored processing information 21. If for example meta-document 20 is a key strategic document, the document information 25 is the text of the strategic document. Processing information 21 may be the time stamp and record of the place of creation of the document. Another example of processing information (not shown) may also include strategic recommendations for all "managers" added by various readers in the environment 30.

Meta-document 20 is then transmitted over the Internet 36 to source (or environment) 32. Source 32 includes a processing program 40 which processes the document information 25 by copying the document text and storing it in a new document. A record of this copying is stored as processing information 26 (with its associated metadata—not shown). A record of the fact that the meta-document 20 was received at source 32 is stored as processing information 22 (with associated metadata not shown). Additional processing information, such as recommendations from reviewers at source 30, may also be stored as processing information with associated metadata on meta-document 20.

When meta-document 20 arrives at source 32, source 32 needs some means of determining what processing information is available on meta-document 20. In one embodiment, meta-document 20 embeds a processing software program 41 called knowledge pollenizer which may be programmed to extract relevant processing information, such as any strategic recommendations contained in processing information 21, and to send them automatically to all the local managers at source 32. Alternatively, source 32 can provide a knowledge pollenizer program 40 for reading all received meta-documents and extracting such defined processing information. This is an example of meta-document 20 pollenizing the environment 32.

Meta-document 20 is then forwarded via the Internet 36 to source (environment) 34. A record of this processing is stored as processing information 23 (with associated metadata not shown). Again the embedded processing program 41 extracts the processing information 21 and other relevant processing information 22 and sends recommendations, if applicable, to all local managers of source 34. In each processing or transformation of meta-document 20 a record of the activity is stored on the meta-document 20. So, if some user wishes, at a later date, to learn if any party copied the text from the meta-document 20, that information is available as processing information 26.

When meta-document is transmitted from source to source and processing information is created (stored in the meta-document) this is similar to a bee travelling to a flower and picking up pollen. Similarly, if a source finds certain processing information on a meta-document of interest, it can copy or use the processing information and of course, trigger actions based upon it. This is similar to pollen carried on a bee's body being left on another flower.

Current technology is mature enough to allow various different implementations of meta-documents. For example, XML metadata (RDF) is a technology which allows the encoding of metadata within documents. Outside classical performance problems that may arise, there is almost no limit in the quality and quantity of metadata or meta-information that can be encoded in a meta-document. Each source having a tool (program) which processes a meta-document for one purpose or another can store processing information and metadata about its processing, including the result of the processing itself.

For example, if at a given time the meta-document is passed through a terminology extraction tool, if terms are detected and defined by a user, the terminology management tool can in turn encode the defined terminology as pollen or processing information and associated metadata within the meta-document. In future use, when the meta-document is sent to a source where a terminology management tool is also available and can read the metadata, the meta-document will be used to pollenize the local terminology database with its pollen or processing information storing the embedded terminology.

Metadata allows encoding of information that is not strictly part of the text of a document. Many applications for meta-documents could benefit of this possibility. Meta-documents may be used, for example, in recommender systems. The Knowledge Pump tool developed at the Xerox Research Center Europe (XRCE) allows users to make recommendations on documents in the form of a rating (e.g., 1 to 5 stars) plus a comment section (text field) explaining why a document is interesting or not. This rating information is valuable knowledge that is currently stored "outside" the document in a dedicated database. In the Knowledge Pump database, the recommended document is just referenced as a URL. If the recommendation is stored as processing information (pollen) and metadata with the document as part of a meta-document according to the invention, these stored recommendations may also be provided when the document is sent around through email or through imports in document management systems. The use of meta-documents is a simple way to provide recommendations (and identified experts and communities) beyond the scope of one organization and could be used as an exchange mechanism between non-connected Knowledge-Pump servers. Therefore, a tool for extracting the processing information or pollen would be associated with each Knowledge Pump database.

Issues about security, access-rights, intellectual property etc. can be addressed by the meta-document creators as part of each meta-document's creation. One factor that must be taken into account when creating meta-documents is their size and complexity. However, emerging technologies such as RDF metadata and DOM (Document Object Model) will readily enable implementation of meta-documents.

As noted above, metadata is commonly defined as data about data. In the context of meta-documents, metadata is defined as data about or related to the "textual part" of a document, but not part of the text itself, including the textual information which describes the processing of the document (processing information or pollen). The Resource Description Framework (RDF) is an abstract model for defining metadata. The basic data model consists of three object types: Resources, Properties and Statements which correspond to a resource associated with a property. Concretely, resources will be elements of the text, and the metadata will associate some properties (knowledge) to these elements.

An important aspect of the metadata model consists of defining the set of properties that can be attached to the resources. This is the role of namespaces. A namespace is a set of names in which all the names are unique. Clearly, part of the value of the metadata model depends on these namespaces. Several important namespaces already exists, and each of them is more or less dedicated to an application or a domain.

In order to create a meta-document, (assuming the basic document information exists) the first step is to define the processing data or information to be encoded in the document, along with the tags to be used to encode this information. Suppose we want to encode the identity of the reader, the rating she/he gives and the associated comments. Using XML/RDF, the following fragment illustrates how such information could be encoded, assuming "Peter" wants to give a recommendation about a technical article:

```
<rdf:RDF
xmlns:kp="http://www.xrce.xerox.com/knowledge_pump ">
<rdf:Description about="Establishing Namespaces for a Recommender
System">
<kp:Reader>Peter Dowson</ kp:Reader>
<kp:Rating>3 Stars</kp s:Rating >
<kp:Comment>Well written article with good background on
recommender systems.
</kp:Comment>
</rdf:Description>
</rdf:RDF>
```

For this example, it is assumed that the knowledge pump has its own namespace, noted kp, associated with an imaginary URL.

Once the recommendation is written and stored as "pollen" or processing information, the next step is when the meta-document reaches a source that may be interested in recording this comment. A tool at the source includes a tool that extracts and uses this knowledge. An advantage of storing comments with the document in question is that specific recommendation databases are no longer needed; all recommendations are stored with the document in question. When a user receives a particular document, all relevant comments are stored with it, ready for the user to read at his/her leisure.

Meta-document-based pollenization as described above includes several steps. The first step is to add pollen. Each tool which processes the document for any purpose encodes the result of the processing (pollen) and associated metadata using a namespace, i.e., a set of well-defined properties associated with resources. The tool can use its own namespace or use a shared namespace with other tools or a standard namespace or a combination of those. The more the tool will share metadata with other tools, the more the document can distribute information to various knowledge tools in the "pollenization" phase. Using a dedicated namespace to encode its data is a way for a knowledge tool to keep control of its data. Basically, this would prevent other tools even of the same family, to exploit the information.

In the second step, the meta-document enters a new pollenization space. The meta-document when moved to a different pollenization space triggers a knowledge pollenizer daemon (a specific tool used to enable selective extraction of pollen). A meta-document is sent to a different pollenization space typically when it is sent through email as an attachment or downloaded through a Web Server. The meta-document is then placed in a different software environment and a different knowledge environment of a different organization or of a different department of the same organization.

Any attempt to save the meta-document locally on a source or environment such as a file system or in a Document Repository will trigger a knowledge pollenizer tool, similar to the way a virus scanning software program is triggered to check files for viruses. This ensures that all processing will be recorded with the meta-document.

In the third step, the knowledge pollenizer tool parses the meta-document looking for all encoded pollen, identifies the pollen and its source and finds a compatible knowledge tool to receive this piece of pollen. The tool presents a list of all pollen items it found and asks the user who originally tried to open or save the meta-document whether or not the user wants any of the pollen to be inserted in the local knowledge environment. The following screen example gives an idea of the kind of interface that could be available for the knowledge pollenizer. In this example, the Knowledge Pump found three recommendations about the document that can be used to pollenize a Knowledge Pump tool or compatible equivalent. The pollenization can also be performed automatically following a simple user-defined profile.

| KNOWLEDGE POLLENIZER | |
|---|---|
| Knowledge pollenizer has found relevant knowledge within your document for all these tools. Please select the one you want to pollenize locally. | |
| X | Knowledge Pump—Recommendations (3) |
| X | MKMS Term Manager—Terms definition (4) |
| X | MKMS - Translation Memory—Aligned Segments (4) |
| | Knowledge Profiler—User Profiling Information (2) |
| X | Knowledge Community—Community Definition (1) |
| X | Docushare Metadata (title, abstract, author, etc.) (5) |
| __ OK | __ Cancel |

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A computer-readable storage medium encoded with data for processing by a data processing system, said data comprising:

a meta-document for tracking and storing all information pertaining to actions performed by an application program on a document comprising document information during its entire lifetime, comprising a file structure including:

an object conveying document information, processing information, and metadata for indexing and retrieving the processing information; wherein all of which are stored on the meta-document and retrievable from the meta-document;

wherein the processing information comprises all information pertaining to each time the meta-document is processed by the application program being executed by the data processing system and any results of the processing during the entire life of the meta-document, the processing information being stored on the meta-document each time the meta-document is processed and being retrievable from the meta-document;

wherein the metadata comprises all associated metadata pertaining to each time the meta-document is processed by the application program being executed by the data processing system during the entire life of the meta-document, the metadata being stored on the meta-document each time the meta-document is processed and being retrievable from the meta-document;

wherein the meta-document is transmitted to a source and parsed at the source for extracting stored processing information and metadata;

wherein processing information is stored pertaining to transmitting and parsing at the source and associated metadata stored on the meta-document;

wherein the meta-document further comprises a first instruction, embedded on the object, responsive to processing of the meta-document, for generating and storing processing information and associated metadata on the meta-document, wherein the parsing is performed by the first instruction; and wherein the meta-document further comprises a second instruction, embedded on the object, for parsing and extracting selected processing information stored on the meta-document, parsing the meta-document for extracting the selected processing information and associated metadata, and distributing the extracted selected processing information to the source.

2. The meta-document of claim 1, wherein processing information comprises information pertaining to transformation of the document information.

3. The meta-document of claim 1, wherein the processing information comprises a user comment to the document information.

4. The meta-document of claim 1, wherein the processing information comprises information pertaining to distribution of the meta-document.

5. The meta-document of claim 1, wherein the application program is embedded on the meta-document.

6. In a data processing system, a computer-implemented method of managing a meta-document comprising:

storing a meta-document for tracking and storing all information pertaining to actions performed by an application program on a document comprising document information on a computer-readable storage medium, the meta-document, wherein the meta-document comprises a file structure including: an object conveying document information, processing information pertaining to processing of the meta-document, and metadata for indexing and retrieving the processing information, wherein all of which are stored on the meta-document and retrievable from the meta-document;

wherein the processing information comprises all information pertaining to each time the meta-document is processed by the application program being executed by the data processing system and any results of the processing during the entire life of the meta-document, the processing information being stored on the meta-document each time the meta-document is processed and being retrievable from the meta-document; and wherein the metadata comprises all associated metadata pertaining to each time the meta-document is processed by the application program being executed by the data processing system during the entire life of the meta-document, the metadata being stored on the meta-document each time the meta-document is processed and being retrievable from the meta-document;

transmitting the meta-document to a source;

parsing the meta-document, at the source, for extracting stored processing information and metadata; and storing processing information pertaining to transmitting and parsing at the source and associated metadata stored on the meta-document, wherein the meta-document further comprises a first instruction, embedded on the object, responsive to processing of the meta-document, for generating and storing processing information and associated metadata on the meta-document, wherein the parsing step is performed by the first instruction, and wherein the meta-document further comprises a second instruction, embedded on the object, for parsing and extracting selected processing information stored on the meta-document, and further comprising the step of:

parsing the meta-document for extracting the selected processing information and associated metadata; and distributing the extracted selected processing information to the source.

7. The method of claim 6, wherein the source comprises a tool, responsive to a processing of the meta-document, for generating and storing processing information and associated metadata on the meta-document, wherein the parsing step is performed by the tool.

8. The method of claim 7, wherein the source further comprises a second tool for parsing and extracting selected processing information stored on the meta-document, and further comprising the step of:

parsing the meta-document for extracting the selected processing information and associated metadata; and distributing the extracted selected processing information to the source.

9. A data processing system for managing document information comprising:

a memory storing a meta-document for tracking and storing all information pertaining to actions performed by an application program on a document comprising document information on a computer-readable storage medium, the meta-document, wherein the meta-document comprises a file structure including: an object conveying document information, processing information pertaining to processing of the meta-document, and metadata for indexing and retrieving the processing information, wherein all of which are stored on the meta-document and retrievable from the meta-document; wherein the processing information comprises all information pertaining to each time the meta-document is processed by the application program being executed by the data processing system and any results of the processing during the entire life of the meta-document, the processing information being stored on the meta-document each time the meta-document is processed and being retrievable from the meta-document; and wherein the metadata comprises all associated metadata pertaining to each time the meta-document is processed by the application program being executed by the data processing system during the entire life of the meta-document, the metadata being stored on the meta-document each time the meta-document is processed and being retrievable from the meta-document;

a processor for executing an application program for processing the meta-document; and a plurality of sources, each source located at a different location, wherein each time the meta-document is received by a source, processing information and its associated metadata is parsed and extracted from the meta-document at the source; and processing information pertaining to transmitting the meta-document to the source and parsing at the source and associated metadata stored on the meta-document, wherein the meta-document further comprises a first instruction, embedded on the object, responsive to processing of the meta-document, for generating and storing processing information and associated metadata on the meta-document, wherein the parsing step is performed by the first instruction, and wherein the meta-document farther comprises a second instruction, embedded on the object, for parsing and extracting selected processing information stored on the meta-document, and farther comprising the step of:

parsing the meta-document for extracting the selected processing information and associated metadata; and distributing the extracted selected processing information to the source.

10. The system of claim 9, wherein processing information comprises information pertaining to transformation of the document information.

11. The system of claim 9, wherein the processing information comprises a user comment to the document information.

12. The system of claim 9, wherein the processing information comprises information pertaining to distribution of the meta-document.

13. The system of claim 9, wherein the source further comprises a tool, responsive to a processing of the meta-document, for generating and storing processing information and associated metadata on the meta-document.

* * * * *